No. 861,764. PATENTED JULY 30, 1907.
W. B. PRITCHARD.
SAFETY PIN.
APPLICATION FILED OCT. 1, 1906.
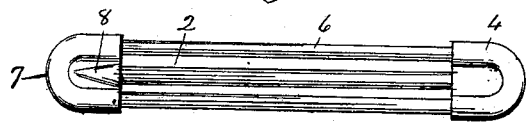
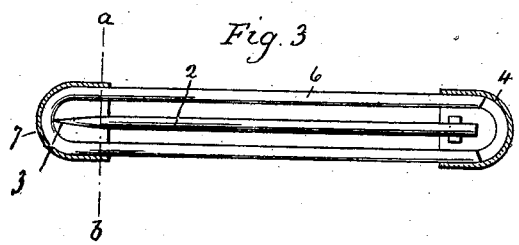
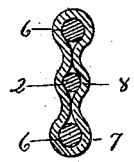
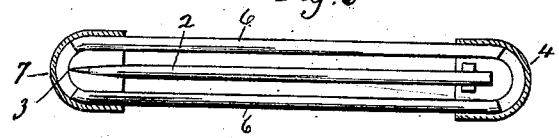
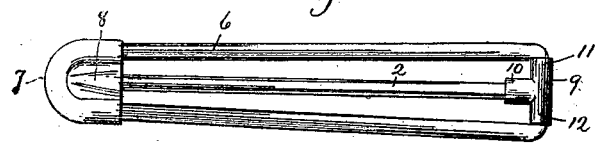
Witnesses:
J. H. Shannon
C. L. Weed.
Willard B. Pritchard
Inventor
By Atty Seymour & Earle

UNITED STATES PATENT OFFICE.

WILLARD B. PRITCHARD, OF WATERBURY, CONNECTICUT, ASSIGNOR OF ONE-HALF TO NAPOLEON F. MATHON, OF WATERBURY, CONNECTICUT.

SAFETY-PIN.

No. 861,764.  Specification of Letters Patent.  Patented July 30, 1907.

Application filed October 1, 1906. Serial No. 336,918.

*To all whom it may concern:*

Be it known that I, WILLARD B. PRITCHARD, a citizen of the United States, residing at Waterbury, in the county of New Haven and State of Connecticut, have invented a new and useful Improvement in Safety-Pins; and I do hereby declare the following, when taken in connection with the accompanying drawings and the letters of reference marked thereon, to be a full, clear, and exact description of the same, and which said drawings constitute part of this specification, and represent, in—

Figure 1 a plan view of a safety pin constructed in accordance with my invention and shown in closed position. Fig. 2 a similar view with the cap disengaged from the point. Fig. 3 a similar view showing the clip and cap in section. Fig. 4 a sectional view on line $a$—$b$ of Fig. 3, enlarged. Fig. 5 a plan view illustrating a modification of my invention. Fig. 6 a view similar to Fig. 3 showing the use of two separate strips of elastic material.

This invention relates to an improvement in safety pins, and while particularly adapted for the uses for which safety pins are generally employed, is applicable for other purposes, such as jewelry in which it is desired to protect or guard the point of the pin, the object of the invention being a simple construction which can be produced at a low cost for manufacture, and which can be more conveniently used in a larger number of cases than ordinary safety pins; and the invention consists in the construction hereinafter described and particularly recited in the claims.

In carrying out my invention, I employ a straight pin 2 having a point 3 and a clip 4 applied to its opposite end which, if desired, may have small wings or fins 5 to facilitate the attachment of the clip to the shank of the pin. Connected with the clip on opposite sides of the pin is a strip of longitudinally extendible flexible fabric 6 such, for instance, as round elastic cord, that is, a strip of rubber covered with a braid of silk or other suitable material. Midway the length of the strip 1 apply a cap 7 similar in form to the guards usually applied to the ends of wire safety pins. This cap is closed upon the cord so as to be firmly united therewith, and in the center of the cap is a socket or pocket 8 to receive the point of the pin, and if desired, the elastic cord may be exposed in the pocket so that the point of the pin may bear against it to protect the point from contact with the metal. While I prefer to attach the free ends of the cord to the clip 4, it is apparent that the ends of the cords might be connected with the cap 7, as shown in Fig. 6, and it is also apparent that instead of using one piece of cord, two short lengths may be employed as shown in Fig. 6. While I prefer to employ the clip 4 corresponding substantially in form to the cap 7, I may attach a T-shaped head 9 as shown in Fig. 5, having three tubular portions, one 10 to receive and be attached to the shank of the pin, while the right-angled tubular portions 11 and 12 receive the ends of the cord. To disengage the cap from the end of the pin, the cap is drawn outward, or the cords extended longitudinally so as to pass beyond the end of the pin as shown in Fig. 2, when they can be turned away from the plane of the pin and leave that pin free to be inserted. After the pin is inserted the cap is again drawn outward and passed over the point thus protecting the point and preventing the withdrawal of the pin.

I claim:—

1. The herein described safety pin comprising a pin having a point at one end and a flat clip formed from a single piece of metal secured to the opposite end, said clip comprising a socket to receive the said pin, and a socket on each side thereof, strips of longitudinally expandible flexible material entered into said sockets and secured therein, a flat cap formed from a single piece of metal connected with the said strips and having a centrally arranged pocket to receive the point of the pin, substantially as described.

2. The herein described safety pin comprising a pin having a point at one end and a clip at the opposite end, a flat cap formed from a single piece of metal and having a centrally arranged pocket to receive the point of the pin and a socket on each side thereof, and longitudinally flexible connections between the clip and the cap, said connections entering the sockets in the cap in which they are secured, substantially as described.

In testimony whereof, I have signed this specification in the presence of two subscribing witnesses.

WILLARD B. PRITCHARD.

Witnesses:
ARTHUR F. HENRY,
HOWARD B. SNOW.